United States Patent
Jackson et al.

(10) Patent No.: US 10,315,726 B2
(45) Date of Patent: Jun. 11, 2019

(54) MID DRIVE SYSTEM FOR AN ELECTRIC BICYCLE

(71) Applicants: Britt Jackson, Santa Monica, CA (US);
Thomas Boyle, Las Vegas, NV (US);
Percy Chien, Thousand Oaks, CA (US)

(72) Inventors: Britt Jackson, Santa Monica, CA (US);
Thomas Boyle, Las Vegas, NV (US);
Percy Chien, Thousand Oaks, CA (US)

( * ) Notice: Subject to any disclaimer, the term of this patent is extended or adjusted under 35 U.S.C. 154(b) by 361 days.

(21) Appl. No.: 15/264,135

(22) Filed: Sep. 13, 2016

(65) Prior Publication Data

US 2017/0073039 A1    Mar. 16, 2017

Related U.S. Application Data

(60) Provisional application No. 62/218,388, filed on Sep. 14, 2015.

(51) Int. Cl.
*B62M 6/55* (2010.01)
*B62M 9/02* (2006.01)

(52) U.S. Cl.
CPC ............. *B62M 9/02* (2013.01); *B62M 6/55* (2013.01); *B62K 2204/00* (2013.01)

(58) Field of Classification Search
CPC ..................... B60K 2204/00; B62K 2204/00
USPC ............................................. 74/661
See application file for complete search history.

(56) References Cited

U.S. PATENT DOCUMENTS

| | | | | |
|---|---|---|---|---|
| 6,012,538 A | * | 1/2000 | Sonobe | B62M 6/45 180/206.3 |
| 7,261,175 B1 | * | 8/2007 | Fahrner | B62M 6/55 180/206.4 |
| 8,640,805 B2 | * | 2/2014 | Kuroki | B62M 6/45 180/205.1 |
| 8,807,260 B2 | * | 8/2014 | Shimizu | G01L 3/102 180/220 |

* cited by examiner

*Primary Examiner* — Ha Dinh Ho
(74) *Attorney, Agent, or Firm* — Kenneth L. Green; Averill & Green

(57) ABSTRACT

A simplified mid-motor drive system includes all necessary electronics and allows for throttle-only operation of the motor. The mid-motor drive system includes an arrangement of uni-directional drive connections (i.e., sprag clutches) between the motor and the pedals which allows each to operate independently or in conjunction, and allows simple modifications to gear ratios of packaged drive systems in order to adapt to regulatory requirements of different worldwide territories.

10 Claims, 3 Drawing Sheets

MID DRIVE SYSTEM FOR AN ELECTRIC BICYCLE

CROSS-REFERENCE TO RELATED APPLICATIONS

The present application claims the priority of U.S. Provisional Patent Application Ser. No. 62/218,388 filed Sep. 14, 2015, which application is incorporated in its entirety herein by reference.

BACKGROUND OF THE INVENTION

The present invention relates to electric bicycles and in particular a mid-drive arrangement for electric bicycles.

In the electric bike market, the "hub" or in-wheel motor has been the dominated configuration. Unfortunately, in in-wheel motor bicycles, there is no way to give a mechanical advantage to the motor using a conventional bicycle transmission. Additionally, when using an in-wheel motor configuration, the rider may input power through the pedals and into a conventional bicycle transmission however, because there is no direct connection between the wheel motor and transmission, it is possible for the rider to choose a gear ratio on the transmission which fails to transfer the rider's power input into the pedals as a useful addition to the bicycle's propulsion. As a result, there is an increasing movement away from an in-wheel motor and there is a need for better alternative motor configurations.

Mid-motor drive systems have been developed to replace wheel motor based electric drives, but known mid-motor designs use a complicated set of gears to combine the power of the motor with the rider power input through the pedals and then transfers all that power to a conventional bicycle transmission. This design often makes it impossible to operate the motor without rotating the pedals via an independent throttle such throttle driven operation being desirable by many consumers. Thus, a need remains for an improved mid-motor drive system.

BRIEF SUMMARY OF THE INVENTION

The present invention addresses the above and other needs by providing a simplified mid-motor drive system which includes all necessary electronics and allows for throttle-only operation of the motor. The mid-motor drive system includes an arrangement of uni-directional drive connections (i.e., sprag clutches) between the motor and the pedals which allows each to operate independently or in conjunction, and allows simple modifications to gear ratios of packaged drive systems in order to adapt to regulatory requirements of different worldwide territories.

In accordance with one aspect of the invention, there is provided a mid-drive system allowing for all the power from the motor, as well as all the power from the rider (input through the pedals) to be transferred into a conventional bicycle transmission thus providing a mechanical gearing advantage.

In accordance with another aspect of the invention, there is provided a mid-drive system package that can easily be integrated into a bicycle frame, with all necessary control electronics, which greatly simplifies the initial manufacturing, wiring and maintenance on an electric bike.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the term "generally" is associated with an element of the invention, it is intended to describe a feature's appearance to the human eye, and not a precise measurement.

Figure 1:
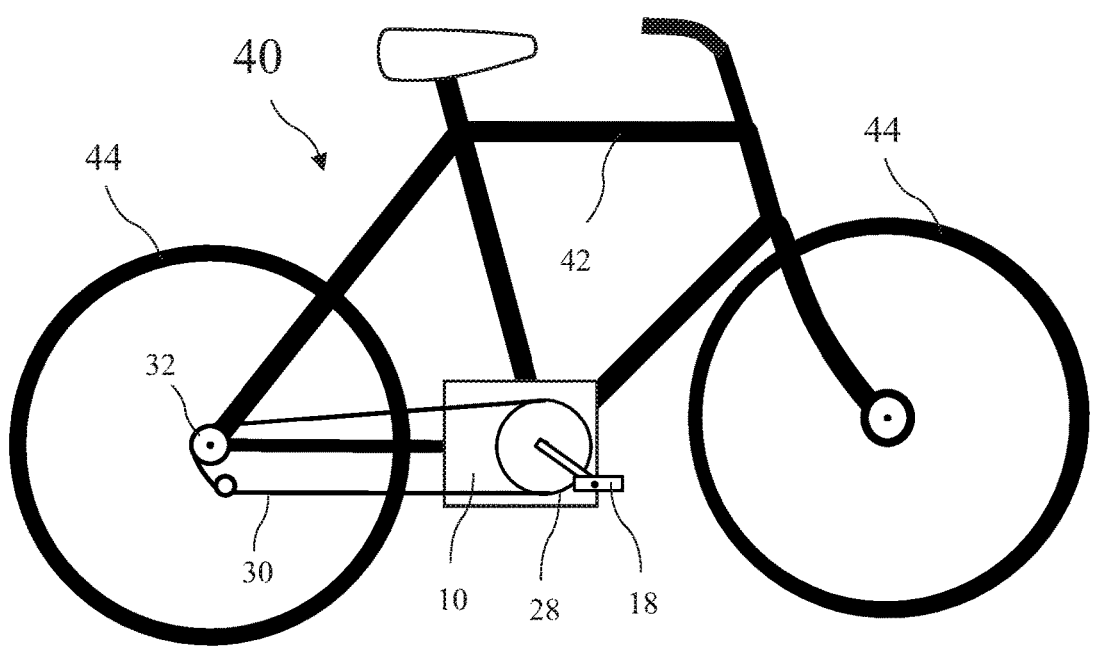
FIG. 1 shows a bicycle having a mid drive according to the present invention.

A bicycle 40 including a mid-motor drive system 10 according to the present invention is shown in FIG. 1. The mid-motor drive system 10 is connected to a bicycle frame 42 and drives a chain (or belt) 30 connected to a drive sprocket 32 driving a bicycle wheel 44. A rider may power the bicycle 40 using pedals 18, or using the mid-motor drive system 10, or using the pedals and the mid-motor drive system 10.

Figure 2:
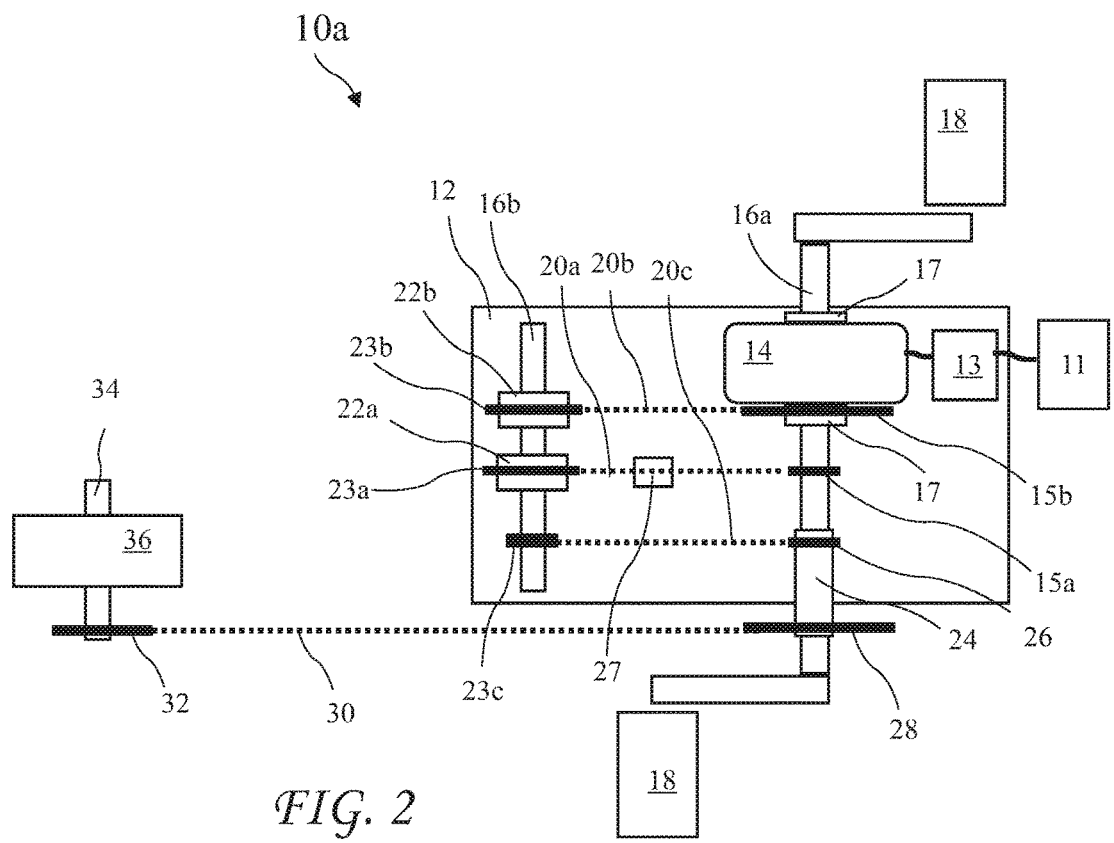
FIG. 2 shows a first embodiment of a mid-motor drive system according to the present invention.
Figures 3A, 3B:
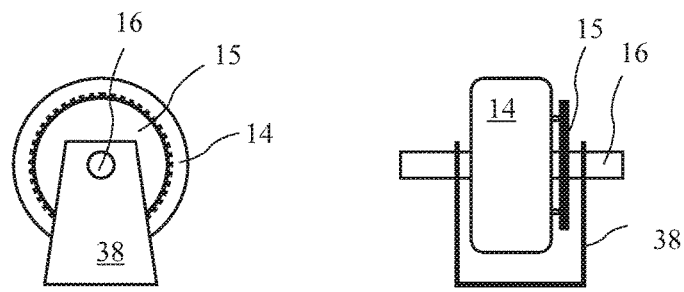
FIG. 3A shows a side view of a motor of the mid-motor drive system according to the present invention.
FIG. 3B shows a front view of the motor of the mid-motor drive system according to the present invention.

A first embodiment of a mid-motor drive system 10a is shown in FIG. 2, a side view of a motor 14 and bottom bracket 38 of the mid-motor drive system 10 is shown in FIG. 3A, and a front view of the motor 14 and bottom bracket 38 is shown in FIG. 3B. The motor 14 is preferably a doughnut motor. The mid-motor drive system 10a includes a housing 12 containing the motor 14 preferably coaxial with a pedal shaft 16a but rotationally decoupled to the pedal shaft 16a by bearings 17, and pedals 18 attached to the pedal shaft 16a.

A mid shaft 16b resides parallel with the pedal shaft 16a. The mid shaft 16b is coupled by a chain (or belt) 20a connecting a fixed (no clutch) sprocket 15a attached to the pedal shaft 16a, to a sprocket 23a, and the sprocket 23a is connected to the mid shaft 16b through uni-directional bearings (or sprag clutches) 22b. The uni-directional bearing 22a couples the chain 20a to the mid shaft 16a when the chain 20a is driven by the pedals 18 to drive the bicycle forward, and decouples the chain 20a from the mid shaft 16b whenever the mid shaft 16b is rotating faster than a rotation produced by the chain 20a.

The mid shaft 16b is coupled to the motor 14 by a fixed (no clutch) sprocket 15b attached to the motor and a chain (or belt) 20b through uni-directional bearings (or sprag clutches) 22b. The uni-directional bearing 22b couples the chain 20b to the mid shaft 16b when the chain 20b is driven by the motor 14 to drive the bicycle forward, and decouple the chain 20b from the mid shaft 16b whenever the mid shaft 16b is rotating faster than a rotation produced by the chain 20b.

Those skilled in the art will recognize that the uni-directional bearings 22a and 22b may be replaced by uni-directional bearings connecting the sprocket 15b to the motor 14 and/or connecting the sprocket 15a to the pedal shaft 16a, thereby providing the same functionality as the uni-directional bearings 22a and 22b.

A sleeve 24 resides over the pedal shaft 16a on bearings to rotate independently of the pedal shaft 16a. The mid shaft 16b is further fixedly (i.e., fixed to always rotate together, not through a clutch) coupled to the sleeve 24 by a chain (or belt) 20c to drive the sleeve 24. The sleeve 24 carries a sprocket 28 coupled to the drive sprocket 32 by a chain (or belt) 30. The sprocket 32 may be a conventional bicycle drive sprocket rotationally fixed to a bicycle wheel, or may be coupled to a transmission 36, for example a multi-speed derailleur, rotationally connected to a bicycle wheel.

A controller 13 resides inside or outside the housing 12 and is electrically connected to batteries 11 which may reside inside or outside the housing 12, and to the motor 14. The controller 13 provide power from the batteries 11 to the motor 14 and the controller 13 may receive data signals from the motor 14, the batteries 11 and/or a pedal torque sensor 27. The pedal torque sensor 27 cooperated with the chain 20b to measure the mechanical power generated by the rider to provide a control signal to the controller 13 as an input to the motor control 13. The pedal torque sensor 27 may measure the torque on the pedal shaft 16a by the rider by sensing tension on the chain 20b between the pedal shaft 16a and mid shaft 16b, or by other means. The pedal torque measurements may be used as an input by the controller 13 in determining the amount of motor 14 assistance in the drive system 10. Alternately, multiple options exist for measuring pedal torque achieve the same result, and a mid drive system using any form of pedal torque measurement is intended to come within the scope of the present invention. A suitable torque sensor is described in U.S. Pat. No. 8,965,610 issued to one of the present inventors.

The rider may rotate the pedals 18, as on a conventional bicycle, and the bicycle can be powered by the electric motor 14. Gear ratio may be changed between the motor sprocket 15 and the mid shaft 16b and between the pedal shaft 16a and the mid shaft 16b and between the mid shaft 16a and the sleeve 24 by replacing sprockets 15a, 15b, 23a, 23b, 23c, and or 26 depending on the specific vehicle application. The gear ratio between the motor 14 and mid shaft 16b may be easily adjusted depending on the speed range of the motor and the specific vehicle application.

Figure 4:
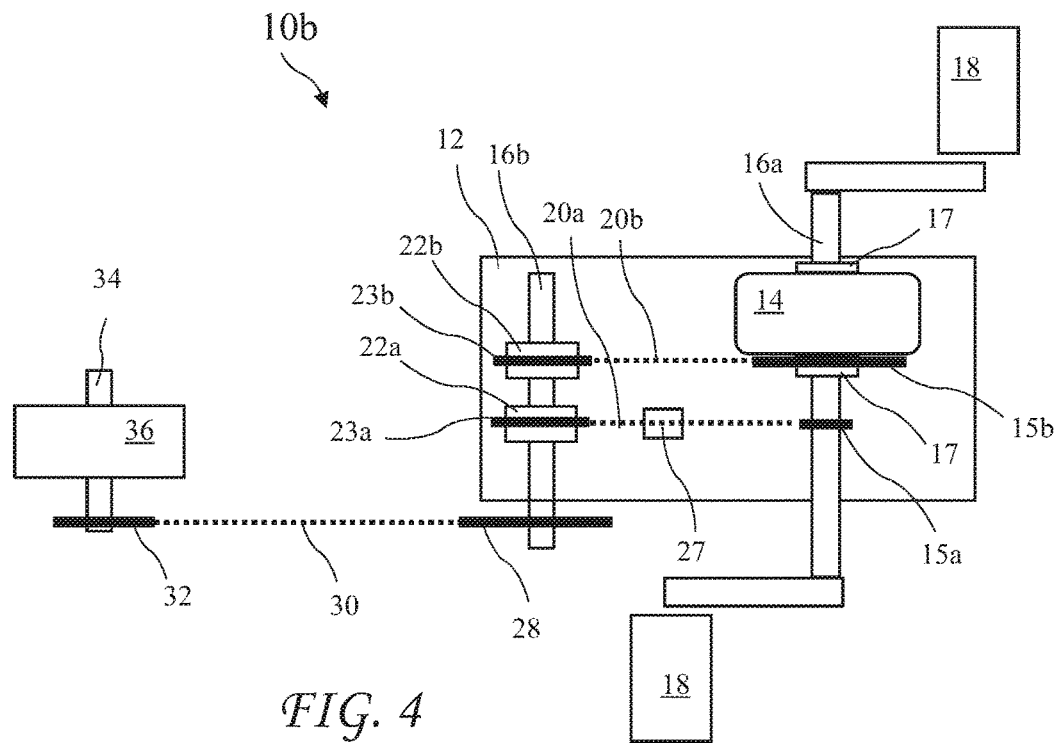
FIG. 4 shows a second embodiment of a mid-motor drive system according to the present invention.

A second embodiment of a mid-motor drive system 10b is shown in FIG. 4. The mid-motor drive system 10b is functionally the same as the mid-motor drive system 10a, but the third mid shaft sprocket 23c and the sleeve sprocket 26, the chain 20c, and the sleeve 24 are placed by moving the sprocket 28 to the mid shaft 16b.

Figure 5:
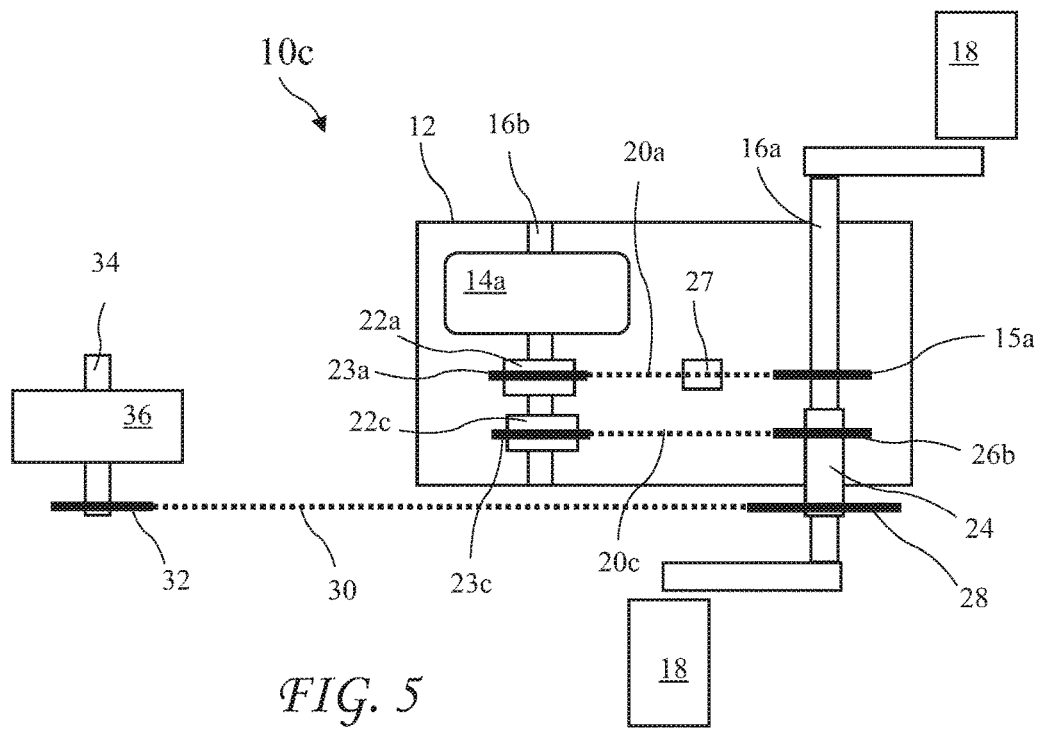
FIG. 5 shows a third embodiment of a mid-motor drive system according to the present invention.

A third embodiment of a mid-motor drive system 10c is shown in FIG. 5. The mid-motor drive system 10c is similar to the mid-motor drive system 10a, but the motor 14a is preferably a conventional low speed motor. The motor 14a has low rotational resistance when not under power and therefore may be rotationally fixed to the mid shaft 16b without producing rotational drag. The mid shaft 16b is coupled by the chain (or belt) 20a connecting the fixed (no clutch) sprocket 15a attached to the pedal shaft 16a, to the sprocket 23a, and the sprocket 23a is connected to the mid shaft 16b through uni-directional bearings (or sprag clutches) 22a. The mid shaft 16b is coupled to the sleeve 24 through the uni-directional bearings 22c so that the mid shaft 16b can drive the sleeve 24 through the chain 20c, but the sleeve 24 cannot drive the mid shaft 16b through the chain 20c.

The conventional bicycle sprocket or multispeed derailleur allows for connection via belt or chain to a variety of conventional bicycle transmissions in the rear wheel including, but not limited to, a derailleur, an internal hub, CVT or a traditional in-wheel motor allowing for additional motor output at a different gear ratio.

Advantageously, the motor and pedals can operate independently of each other without interfering with each other, which means that the drive can be operated as a throttle driven power source with no rider pedal input, a pedal-assist power source that registers rider pedal input and supplies proportional power assist, or as a conventional pedal bike without adding significant amount of drag on the total system.

While the invention herein disclosed has been described by means of specific embodiments and applications thereof, numerous modifications and variations could be made thereto by those skilled in the art without departing from the scope of the invention set forth in the claims.

We claim:
1. A mid drive system for an electric bicycle, the mid drive system comprising:
   a pedal shaft with pedals for a rider;
   a mid shaft residing parallel with the pedal shaft;
   a first pedal shaft sprocket co-axial with the pedal shaft;
   a first mid shaft sprocket co-axial with the mid shaft;
   a first chain or belt rotationally couples the first pedal sprocket to the first mid shaft sprocket;
   the mid shaft driven by the pedal shaft through the first pedal shaft sprocket, the first chain or belt, and the first mid shaft sprocket, and through a first uni-directional bearing, the pedal shaft rotationally coupled to the mid shaft by the first uni-directional bearing when the pedal shaft drives the mid shaft, and decoupled from the mid shaft when the pedal shaft is not driving the mid shaft;
   an electric motor rotationally coupled to drive the mid shaft;
   a drive sprocket fixedly rotationally coupled to the mid shaft; and
   a chain or belt coupling the drive sprocket to a bicycle wheel.

2. The drive system of claim 1, wherein the electric motor is rotationally coupled to drive the mid shaft through a second uni-directional bearing, the second uni-directional bearing couples the electric motor to the mid shaft when the electric motor is driving the mid shaft, and the electric motor decoupled from the mid shaft when the electric motor is not driving the mid shaft.

3. The drive system of claim 2, wherein:
   the electric motor resided co-axially with the pedal shaft;
   a motor sprocket resides co-axial with the electric motor;
   a second mid shaft sprocket reside co-axial with the mid shaft;
   a second chain or belt rotationally couples the motor sprocket to the second mid shaft sprocket; and
   the mid shaft is driven by the electric motor through the motor sprocket, the second chain or belt, and the second mid shaft sprocket, and through the second uni-directional bearing, the electric motor rotationally coupled to the mid shaft by the second uni-directional bearing when the electric motor drives the mid shaft, and decoupled from the mid shaft when the electric motor is not driving the mid shaft.

4. The drive system of claim 3, wherein the first mid shaft sprocket is rotationally coupled to the mid shaft through the first uni-directional bearing.

5. The drive system of claim 3, wherein the second mid shaft sprocket is rotationally coupled to the mid shaft through the second uni-directional bearing.

6. The drive system of claim 3, wherein the chain or belt coupling the drive sprocket to the bicycle wheel comprises:
   a third mid shaft sprocket co-axial with the mid shaft;
   a sleeve co-axial with the pedal shaft and free to rotate on the pedal shaft;
   a sleeve sprocket co-axial with the sleeve;
   a third chain or belt rotationally coupling the third mid shaft sprocket with the sleeve sprocket;
   the drive sprocket co-axial with the sleeve; and
   a fourth chain or belt rotationally coupling the drive sprocket to the bicycle wheel.

7. The drive system of claim 3, wherein the chain or belt coupling the drive sprocket to the bicycle wheel comprises:
   the drive sprocket co-axial with the mid shaft; and
   a fourth chain or belt rotationally coupling the drive sprocket to the bicycle wheel.

8. The drive system of claim 3, wherein the electric motor is a doughnut motor.

9. The drive system of claim 1, wherein the electric motor is rotationally fixed to the mid shaft.

10. The drive system of claim 1, wherein the electric motor is low speed motor having low rotational resistance when not under power.

\* \* \* \* \*